(12) United States Patent
Kilper et al.

(10) Patent No.: US 7,746,548 B2
(45) Date of Patent: Jun. 29, 2010

(54) OPTICAL AMPLIFIER TRANSIENT CONTROL WITH GAIN ERROR LIMITS

(75) Inventors: Daniel Charles Kilper, Rumson, NJ (US); Christopher Alan White, Neshanic Station, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 160 days.

(21) Appl. No.: 11/846,845

(22) Filed: Aug. 29, 2007

(65) Prior Publication Data

US 2009/0059354 A1    Mar. 5, 2009

(51) Int. Cl.
*H04B 10/17*    (2006.01)
*H04B 10/12*    (2006.01)

(52) U.S. Cl. .................................. 359/341.41
(58) Field of Classification Search .............. 359/341.41
See application file for complete search history.

(56) References Cited

U.S. PATENT DOCUMENTS

| | | | | |
|---|---|---|---|---|
| 6,163,399 A * | 12/2000 | Berg | ...................... | 359/337.13 |
| 6,166,850 A * | 12/2000 | Roberts et al. | ........... | 359/341.2 |
| 6,515,777 B1 * | 2/2003 | Arnold et al. | ................. | 398/97 |
| 6,519,081 B2 * | 2/2003 | Lelic et al. | ............... | 359/341.4 |
| 6,522,460 B2 * | 2/2003 | Bonnedal et al. | ....... | 359/341.42 |
| 6,556,345 B1 * | 4/2003 | Gassner et al. | ........... | 359/341.4 |
| 6,661,570 B2 * | 12/2003 | Nakaji | .................... | 359/341.41 |
| 6,798,567 B2 * | 9/2004 | Feldman et al. | ........ | 359/341.42 |
| 6,959,126 B1 * | 10/2005 | Lofland et al. | ................ | 385/16 |
| 6,989,923 B2 * | 1/2006 | Stentz | .................... | 359/341.41 |
| 2001/0033413 A1 * | 10/2001 | Lelic et al. | ............... | 359/341.4 |
| 2001/0043389 A1 * | 11/2001 | Bonnedal et al. | ....... | 359/341.41 |
| 2003/0030894 A1 * | 2/2003 | Stentz | .................... | 359/341.41 |

* cited by examiner

*Primary Examiner*—Eric Bolda
(74) *Attorney, Agent, or Firm*—Brosemer, Kolefas & Assoc.

(57) ABSTRACT

Optical amplifier transient control methods and apparatus which limit the extent of cumulative transient gain errors in the rapid control of multiple optical amplifiers in a communication system. In an exemplary embodiment, if the input power to an optical amplifier drops below a predetermined threshold, the gain of the amplifier is set to clamp the output power of the amplifier to its initial level less the threshold, thereby preventing the continuous growth of gain error. This is based on the assumption that once the input power goes below the threshold, it should no longer go above the threshold until the transient condition is corrected. The present invention can operate to handle down-as well as up-transient events and is not amplifier technology dependent.

27 Claims, 4 Drawing Sheets

| SPAN | 1 | 2 | 3 | 4 | 5 | 6 | 7 | 8 | 9 | 10 |
|---|---|---|---|---|---|---|---|---|---|---|
| GAIN ERROR (conv) | 0.5 | 1.0 | 1.5 | 2.0 | 2.5 | 3.0 | 3.5 | 4.0 | 4.5 | 5.0 |
| GAIN ERROR | 0.5 | 0.5 | 0.5 | 0.5 | 0.5 | 0.5 | 0.5 | 0.5 | 0.5 | 0.5 |

FIG. 2

| SPAN | 1 | 2 | 3 | 4 | 5 | 6 | 7 | 8 | 9 | 10 |
|---|---|---|---|---|---|---|---|---|---|---|
| GAIN ERROR (conv) | 0.5 | 1.0 | 1.5 | 2.0 | 2.5 | 3.0 | 3.5 | 4.0 | 4.5 | 5.0 |
| GAIN ERROR | 0.5 | 1.0 | 1.5 | 2.0 | 2.5 | 3.0 | 3.0 | 3.0 | 3.0 | 3.0 |

FIG. 3

| SPAN | 1 | 2 | 3 | 4 | 5 | 6 | 7 | 8 | 9 | 10 |
|---|---|---|---|---|---|---|---|---|---|---|
| GAIN ERROR (conv) | 0.5 | 1.0 | 1.5 | 2.0 | 2.5 | 3.0 | 3.5 | 4.0 | 4.5 | 5.0 |
| GAIN ERROR | 0.5 | 1.0 | 1.5 | 2.0 | 2.5 | 3.0 | 3.5 | 4.0 | 4.5 | 5.0 |

*FIG. 4*

OPTICAL AMPLIFIER TRANSIENT CONTROL WITH GAIN ERROR LIMITS

FIELD OF THE INVENTION

The present invention relates to the field of optical communications, and more specifically to optical amplifier transient control methods and apparatus.

BACKGROUND INFORMATION

In a typical path of an optical communication system, an optical signal will be amplified by multiple optical amplifiers along the path. Optical amplifiers in communication systems are typically operated such that the gain of each amplifier is held constant using a control loop operating in accordance with a control algorithm. The control algorithms that have been used in various implementations follow several different approaches. For example, one approach is to operate at a constant gain unless the power change at the amplifier input exceeds some threshold value, at which point a rapid response algorithm is implemented. This helps overcome the lagging response of the amplifier to very rapid and large power changes that might occur, for example, due to a fiber break. For rapid adjustments, most algorithms respond with limited information based upon measurements of the total optical power input and/or output of the amplifier.

In wavelength-division multiplexing (WDM) optical transmission systems, the input power to optical amplifiers can change due to a wide variety of events such as the loss of WDM channels, faulty components, and upstream network power adjustments, among others. It is desirable in such systems for each WDM channel to maintain a particular target power and therefore the gain profile of the optical amplifiers is set to a value that depends on the number of WDM channels and their target powers. This is typically achieved by directly setting the amplifier to achieve the target output or by maintaining a fixed gain in the amplifier using a variety of different algorithms. At random times in the network operation, however, channels can be lost due to events such as, for example, an upstream fiber break. When channels are lost, the amplifiers must be adjusted down in power to the level appropriate for the new channel configuration. During this process, there can be error in the power setting and this gain error can potentially grow as the signals are transmitted through the network. This is particularly true when abrupt changes occur making it difficult for the system to rapidly adjust. During such rapid changes, it may not be possible to determine the actual power of each WDM channel at an amplifier input. Each amplifier must adjust its gain, therefore, based upon the total input and/or output power changes or other indicators and not directly using actual channel powers. This results in a greater likelihood of error.

Moreover, optical amplifiers may be distributed, with an amplifier's input and output located at two different geographic locations. When a failure occurs, the amplifier control mechanism must respond using information about only the output power. Because the control mechanism does not know the input power, it is impossible for it to maintain constant gain. Depending on the pre- and post-transient channel powers, it may be possible to reduce the total gain error, however, it is very difficult to have zero gain error for all possible channel configurations.

The rapid nature of transient events and the errors involved in responding thereto means that it is often impossible to communicate control information (e.g., channel powers) between different nodes when such events occur.

SUMMARY OF THE INVENTION

The present invention is directed to optical amplifier transient control methods and apparatus which limit the extent of cumulative transient gain errors in the rapid control of multiple optical amplifiers in a communication system. In an exemplary embodiment of the present invention, if the input power to an optical amplifier drops by more than a predetermined threshold (a "negative-transient" event) the amplifier is controlled to limit the output power of the amplifier to its initial level less the threshold, thereby preventing the accumulation of gain error over multiple amplifiers. This is based on the assumption that once the input power drops below a given level, it should no longer go beyond that level, at least until the transient status is removed. Similarly, if the input power to an optical amplifier rises by more than a predetermined threshold (a "positive-transient" event) the amplifier is controlled to limit the output power of the amplifier to its initial level plus the threshold, thereby preventing the accumulation of gain error over multiple amplifiers.

The present invention can operate to deal with negative- or positive-transient events, or both, and can be applied to any amplifier technology, including constant-gain amplifier technologies, such as Raman, EDFA, and others.

The aforementioned and other features and aspects of the present invention are described in greater detail below.

BRIEF DESCRIPTION OF THE DRAWINGS

FIG. 2 is a table showing cumulative gain error for a 10-span optical communication system with and without transient gain control in accordance with the present invention, for the case of a 2.5 dB down-transient with a 0.5 dB per span gain error.

FIG. 3 is a table showing cumulative gain error for a 10-span optical communication system with and without transient gain control in accordance with the present invention, for the case of a 5.0 dB down-transient with a 0.5 dB per span gain error.

FIG. 4 is a table showing cumulative gain error for a 10-span optical communication system with and without transient gain control in accordance with the present invention, for the case of a 10.0 dB down-transient with a 0.5 dB per span gain error.

DETAILED DESCRIPTION

Figure 1:
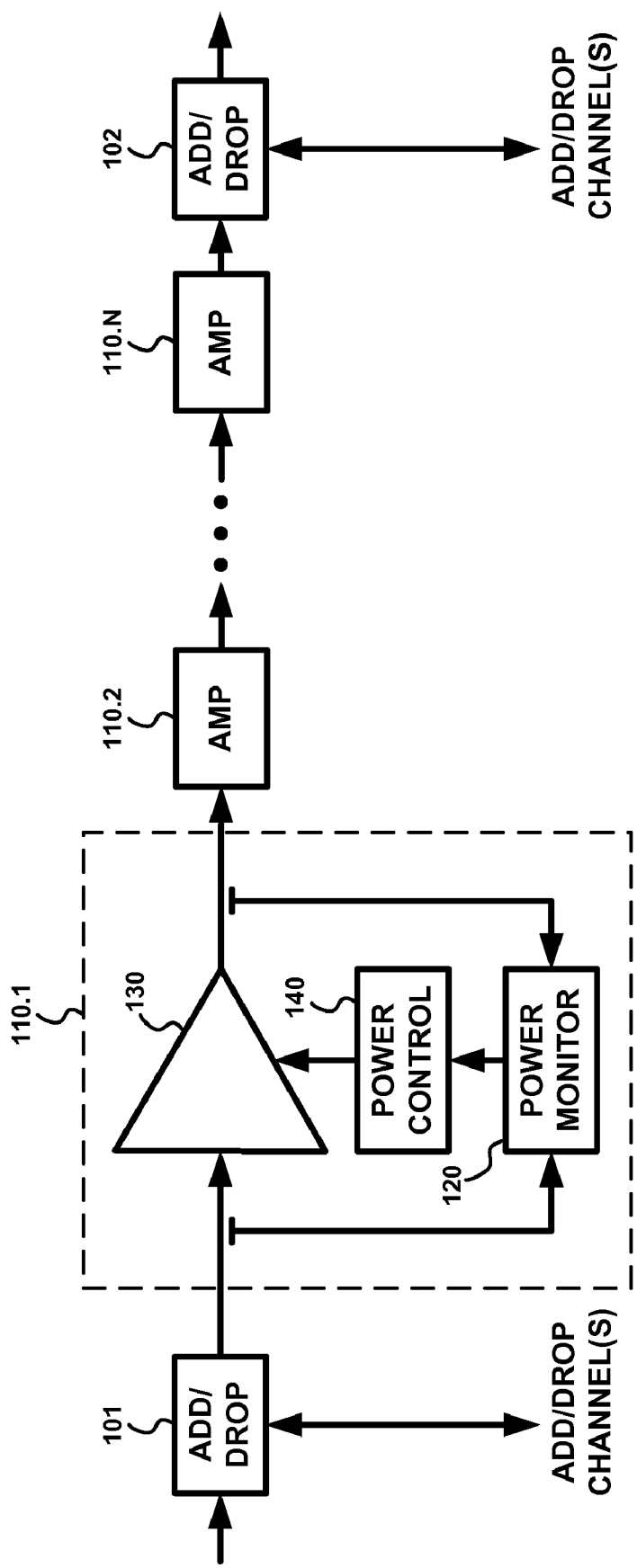
FIG. 1 is a block diagram of a typical optical communication system incorporating an exemplary embodiment of a transient power control scheme in accordance with the present invention.

FIG. 1 is a block diagram of a typical wavelength division multiplexing (WDM) optical communication system 100 incorporating an exemplary embodiment of a transient power control scheme in accordance with the present invention. The system 100 comprises an add/drop node 101 followed by a plurality of optical amplifier blocks 110.1-110.N. In normal operation, individual WDM channels are added or dropped at the node 101 to a stream of WDM channels which are propagated through the system via the optical amplifier blocks 110.1-110.N before encountering another add/drop node 102. Note that while there are typically multiple optical amplifier blocks 110.1-110.N between add/drop nodes, as shown, there may be only one.

In the embodiment of FIG. 1, each optical amplifier block 110 comprises a power monitor 120, amplifier 130, and power control block 140. The power monitor 120 can monitor the input and/or output power of the amplifier 130 and provides that information to the power control block 140 which controls the gain of the amplifier in accordance with the principles of the present invention. The power monitor 120 can be implemented, for example, using a photodiode, which is fast and provides an indication of the total power across all WDM channels, or with a spectrometer, which is slower, but which can determine the power of individual WDM channels.

As mentioned, it is possible, in accordance with the principles of the present invention, to monitor either the input or the output power of the amplifier or both. For certain types of amplifiers (e.g., EDFA), the input and output are at the same geographic location, whereas for other amplifiers (e.g., distributed Raman) they may be located at either end of what could be 100 km of fiber, for example. Where possible, as in the case of collocation of the amplifier input and output, the input power is preferably measured directly. Where the input power is not directly measurable, as in the case of a distributed amplifier, the input power can be inferred from the output power. In other words, if the output power of the optical amplifier drops by a given amount, without changing the amplifier gain, it can be inferred that the input power will have similarly dropped by a corresponding amount.

As discussed above, upon occurrence of an upstream transient event in which WDM channels are lost, the amplifiers must be adjusted down in power to the level appropriate for the new channel configuration. During this process, there can be error in the amplifiers' power settings and this error can potentially grow as the signals are transmitted through the network. This "post-transient" gain error may be additive for all amplifiers in the system 100. Thus if a given channel configuration gives rise to a 0.5 dB gain error per span, i.e., the gain of each amplifier is 0.5 dB too high, after 10 spans, this will result in a 5 dB total gain error. An exemplary embodiment of the present invention operates to limit this growth in gain error across multiple spans.

Note that a transient event can be an "up-transient," which causes a sudden increase in the optical power, or a "down-transient," which causes a sudden decrease in the optical power. A down-transient is a transient event which causes a drop in power which drop exceeds a quantity $P_{downthreshold}$, whereas an up-transient is a transient event which causes a rise in power which rise exceeds a quantity $P_{upthreshold}$.

In an exemplary embodiment of the present invention, at each amplifier block 110, the input and/or output power is monitored to detect the occurrence of a transient event, as defined above. If a transient event is detected, a rapid-response procedure is carried out with the purpose of maintaining the gain of the surviving channels substantially constant. In the rapid-response procedure, the desired (or "target") gain setting of the amplifier is determined as follows (assuming all quantities calculated using a logarithmic scale, e.g., in units of decibels, dB):

Target post-transient Gain=pre-transient Gain−Δ, (1)

and the gain of the amplifier is set accordingly.

If the detected transient event is a down-transient event (i.e., a transient event which causes a drop in power which exceeds a quantity $P_{downthreshold}$), the gain adjustment Δ is determined as follows:

Δ=max {0, post-transient $P_{in}$−(pre-transient $P_{in}$−$P_{downthreshold}$)}, (2)

with $P_{in}$ being the amplifier input power.

If, however, the detected transient event is an up-transient event (i.e., a transient event which causes a rise in power which exceeds a quantity $P_{upthreshold}$), the gain adjustment Δ is determined as follows:

Δ=min{0, post-transient $P_{in}$−(pre-transient $P_{in}$+$P_{upthreshold}$)} (3)

Note that in accordance with Eqs. 1-3, Δ will be zero and no gain adjustment will be carried out if the magnitude of the change in input power is equal to or exceeds $P_{downthreshold}$, in the case of a down-transient, or $P_{upthreshold}$, in the case of an up-transient.

As expressed in Eq. 2, for a down-transient event, the maximum power input to each amplifier should not be larger than the pre-transient input power minus the down-transient threshold. If the input power to an amplifier is larger than this, then it means the input power has grown due to a gain error from a previous amplifier. If the post-transient input power is detected at an amplifier to be greater than the pre-transient input power less $P_{downthreshold}$, then Δ will be a positive number and the gain of the amplifier will be reduced by this amount, thus limiting the accumulation of gain errors.

Similarly, as expressed in Eq. 3, for an up-transient event, the maximum power input to each amplifier should not be smaller than the pre-transient input power plus the up-transient threshold. If the input power to an amplifier is smaller than this, then it means the input power has dropped due to a gain error from a previous amplifier. If the post-transient input power is detected at an amplifier to be smaller than the pre-transient input power plus $P_{upthreshold}$, then Δ will be a negative number and the gain of the amplifier will be increased by this amount, thus limiting the accumulation of gain errors.

In an exemplary embodiment, the transient thresholds $P_{downthreshold}$ and $P_{upthreshold}$ have the same positive value (e.g., 2.5 dB). Note, however, that the values of the down- and up-transient thresholds need not be the same. Appropriate values for the transient thresholds should be selected based on the error tolerance of the system. For example, for a system that can still operate with a +4 dB change in input power, a 3 dB power change would be an appropriate up-transient threshold value to trigger transient control in accordance with the present invention.

In an exemplary embodiment, the threshold values may also be set to allow the intentional addition or removal of one or more channels without being detected as a transient event and thus without triggering a rapid response procedure, such as described above. Thus, for example, the threshold values can be generally proportional to the number of channels added or dropped (or the power change effected thereby). This approach allows for planned changes in the number of channels, which preferably would be applied in a controlled fashion, for example one at a time, allowing the system time to adjust to the new conditions.

In an exemplary embodiment, the threshold values may be set in relation to specific characteristic powers in the system. For example, in the case of a down transient, the threshold might be set to the difference between the current output power and the minimum power expected for a single channel or in the case of an up transient, the threshold might be set to the difference between the current output power and the maximum power for all channels present in the system. Preferably, the power should never go above the maximum power for a system with all channels present and the power should never go below the minimum power for a single channel. Setting the thresholds to clamp the gain when these powers are reached will prevent these cases from ever occurring (they might occur for example due to the gain error becoming very large). This would be the least restrictive version of the thresholding.

In an exemplary embodiment, the threshold values may be set in proportion to the number of channels present at the amplifier or in proportion to the number of channels occupying specific segments of the optical spectrum. The system may be able to tolerate larger gain errors depending on the number of channels and their location in the spectrum. In an exemplary embodiment, if the number of channels present at the amplifier is below a predetermined number (e.g., 10), each of the thresholds can be set to a first value (e.g., 3 dB) and if the number of channels is above the predetermined number, each of the thresholds can be set to a second value (e.g., 2 dB). The threshold values can also be set in accordance with the distribution of currently active channels over the optical spectrum. For example, if most of the channels are located in the short wavelength half of the spectrum, then each of the threshold values can be set to a first value (e.g., 2 dB), but if most of the channels are located in the long wavelength half, then each of the threshold values can be set to a second value (e.g., 3 dB). The threshold values may also be set in accordance with continuous functions of the number and the wavelength of channels, or both. The exact form will depend on the details of the transmission system design and performance, which can vary widely.

The values of the transient thresholds may be adjustable to accommodate various conditions as they occur.

At each amplifier block 110, the power control block 140 controls the gain of the amplifier 130 in accordance with Eqs. 1-3, based on the optical power as monitored by the power monitor 120. When the power monitor 120 detects a transient event, it informs the power control block 140. As discussed above, a down-transient is detected when a transient event causes a drop in power which exceeds a quantity $P_{downthreshold}$, whereas an up-transient is detected when a transient event causes a rise in power which exceeds a quantity $P_{upthreshold}$. If a down-transient is detected, the power control block 140 adjusts the gain of the amplifier 130 in accordance with Eq. 2. If an up-transient is detected, the power control block 140 adjusts the gain of the amplifier in accordance with Eq. 3.

Once a transient condition has passed, a further control mechanism or procedure is initiated to bring the system back to its original operating state. This could be another process, for example, which uses communications among the network nodes in order to monitor conditions and to stabilize the system accordingly. Suitable processes may entail varying combinations of automation and human intervention.

The operation of an exemplary embodiment of the present invention under various exemplary conditions will now be described.

FIG. 2 shows a table of cumulative gain errors after each span of a 10-span system, with a 0.5 dB gain error per span and a 2.5 dB down-transient threshold. A 2.5 dB down-transient event is assumed. For comparison, the table of FIG. 2 in the second row shows the cumulative gain error for a conventional system. In the example of FIG. 2, the pre-transient input power minus 2.5 dB is used as the input power for each span, thus effectively eliminating the gain error from all previous spans at each node.

FIG. 3 shows a table of cumulative gain errors for the same system with a 5.0 dB down-transient event. For each span up to span 7, the post-transient input power for each span is used to set the gain for that span. The gain errors accumulate as normal. For span 7, however, the post-transient input power has become the pre-transient power −2.0 dB (i.e., −5.0 dB down-transient, +3.0 dB cumulative gain error). Thus, per Eq. 2, instead of using this power for setting the gain of span 7, the pre-transient power −2.5 dB, which is smaller, is used. This has the effect of reducing the gain from this span by 0.5 dB. (i.e., because the power control for span 7 thinks the input power is 0.5 dB lower than it actually is, it will reduce the gain for span 7 by this amount).

FIG. 4 shows a table of gain errors for the same system as in FIGS. 2 and 3, but with a 10 dB down-transient. For this case, there is no difference in gain error between the inventive and conventional control methods.

The method of the present invention effectively limits the growth in gain error to the size of the transient, minus $P_{downthreshold}$ (or $P_{upthreshold}$) plus the gain error for one span. By imposing a maximum gain error within the amplifiers, the exemplary scheme acts as a safety net in case of large transient events. Additionally, the scheme tends to damp large power overshoots.

Generally, for a typical system, a large number of different channel configurations may result from transient events. The exemplary gain control scheme of the present invention attempts to achieve zero gain error for the average or typical configuration. In a further exemplary embodiment, however, the gain control can be biased to achieve a positive or a negative gain error for the average configuration. For example, if the optical communication system is more robust to lower power levels, the gain control preferably would be biased to achieve mostly negative gain errors. While it may not be possible to obtain perfect properties for all channel configurations (i.e., some configurations will yield positive errors while others will yield negative errors), by adjusting the control properties it is possible to make either positive or negative errors predominate.

In further exemplary embodiments, for systems in which only one type of transient is possible or likely, a control scheme may be implemented to operate only in accordance with Eq. 2 (for systems with down-transients), or Eq. 3 (for systems with up-transients).

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. A method of minimizing gain error in an optical communication system due to a transient event, the method comprising:
   detecting a transient event;
   upon detecting a transient event, comparing a change in an optical signal power of an optical amplifier to a threshold value; and
   adjusting a gain of the optical amplifier if the change in signal power is less than the threshold value, wherein the gain of the optical amplifier is adjusted in accordance with a difference between the change in signal power and the threshold value,
   wherein the threshold value is approximately 2.5 dB.

2. The method of claim 1, wherein the gain of the optical amplifier is reduced by an amount which is a function of the difference between the change in signal power and the threshold value when the transient event is a down-transient event.

3. The method of claim 1, wherein the gain of the optical amplifier is increased by an amount which is a function of the difference between the change in signal power and the threshold value when the transient event is an up-transient event.

4. The method of claim 2, wherein the gain of the optical amplifier is reduced by an amount substantially equal to the difference between the change in signal power and the threshold value, thereby limiting the accumulation of gain errors over multiple optical amplifiers.

5. The method of claim 3, wherein the gain of the optical amplifier is increased by an amount substantially equal to the difference between the change in signal power and the threshold value, thereby limiting the accumulation of gain errors over multiple optical amplifiers.

6. The method of claim 1, wherein the transient event is detected by monitoring the optical signal power of the optical amplifier for a change that is at least as large as the threshold value.

7. The method of claim 1, wherein the optical signal includes a plurality of wavelength-division multiplexed (WDM) channels.

8. The method of claim 6, wherein monitoring the optical signal power of the optical amplifier includes monitoring a total optical signal power input to the optical amplifier.

9. The method of claim 6, wherein the optical signal includes a plurality of wavelength-division multiplexed (WDM) channels and monitoring the optical signal power of the optical amplifier includes monitoring a power of each of the plurality of WDM channels of the optical signal input to the optical amplifier.

10. The method of claim 6, wherein monitoring an optical signal power of the optical amplifier includes inferring an optical signal power input to the optical amplifier from an optical signal power output from the optical amplifier.

11. The method of claim 6, wherein monitoring the optical signal power of the optical amplifier includes monitoring a total optical signal power output from the optical amplifier.

12. The method of claim 6, wherein the optical signal includes a plurality of wavelength-division multiplexed (WDM) channels and monitoring the optical signal power of the optical amplifier includes monitoring a power of each of the plurality of WDM channels of the optical signal output from the optical amplifier.

13. A method of minimizing gain error in an optical communication system due to a transient event, the method comprising:
  detecting a transient event;
  upon detecting a transient event, comparing a change in an optical signal power of an optical amplifier to a threshold value; and
  adjusting a gain of the optical amplifier if the change in signal power is less than the threshold value, wherein the gain of the optical amplifier is adjusted in accordance with a difference between the change in signal power and the threshold values,
  wherein the optical signal includes a plurality of wavelength-division multiplexed (WDM) channels and the threshold value is a function of a change in signal power due to an intended change in the number of WDM channels, so that the intended change in the number of WDM channels is not detected as a transient event.

14. The method of claim 7, wherein the threshold value is a function of at least one of a minimum signal power of the system and a maximum signal power of the system.

15. The method of claim 7, wherein the threshold value is a function of the number of WDM channels currently at the optical amplifier.

16. The method of claim 7, wherein the threshold value is a function of a wavelength of the WDM channels currently at the optical amplifier.

17. The method of claim 13, wherein the gain of the optical amplifier is reduced by an amount which is a function of the difference between the change in signal power and the threshold value when the transient event is a down-transient event.

18. The method of claim 13, wherein the gain of the optical amplifier is increased by an amount which is a function of the difference between the change in signal power and the threshold value when the transient event is an up-transient event.

19. The method of claim 17, wherein the gain of the optical amplifier is reduced by an amount substantially equal to the difference between the change in signal power and the threshold value, thereby limiting the accumulation of gain errors over multiple optical amplifiers.

20. The method of claim 18, wherein the gain of the optical amplifier is increased by an amount substantially equal to the difference between the change in signal power and the threshold value, thereby limiting the accumulation of gain errors over multiple optical amplifiers.

21. The method of claim 13, wherein the transient event is detected by monitoring the optical signal power of the optical amplifier for a change that is at least as large as the threshold value.

22. The method of claim 21, wherein monitoring the optical signal power of the optical amplifier includes monitoring a total optical signal power input to the optical amplifier.

23. The method of claim 21, wherein the optical signal includes a plurality of wavelength-division multiplexed (WDM) channels and monitoring the optical signal power of the optical amplifier includes monitoring a power of each of the plurality of WDM channels of the optical signal input to the optical amplifier.

24. The method of claim 21, wherein monitoring an optical signal power of the optical amplifier includes inferring an optical signal power input to the optical amplifier from an optical signal power output from the optical amplifier.

25. The method of claim 21, wherein monitoring the optical signal power of the optical amplifier includes monitoring a total optical signal power output from the optical amplifier.

26. The method of claim 21, wherein the optical signal includes a plurality of wavelength-division multiplexed (WDM) channels and monitoring the optical signal power of the optical amplifier includes monitoring a power of each of the plurality of WDM channels of the optical signal output from the optical amplifier.

27. The method of claim 13, wherein the threshold value is approximately 2.5 dB.

* * * * *